US006850680B2

(12) United States Patent
Gorlier et al.

(10) Patent No.: US 6,850,680 B2
(45) Date of Patent: Feb. 1, 2005

(54) CHROMATIC DISPERSION COMPENSATING FIBER FOR USE IN U BAND OPTICAL FIBER TRANSMISSION SYSTEMS

(75) Inventors: Maxime Gorlier, Paris (FR); Louis-Anne de Montmorillon, Paris (FR); Pierre Sillard, Le Chesnay (FR); Ludovic Fleury, Bois d'Arcy (FR); Florent Beaumont, Conflans Ste Honorine (FR); Pascale Nouchi, Maisons-Lafitte (FR)

(73) Assignee: Alcatel, Paris (FR)

( * ) Notice: Subject to any disclaimer, the term of this patent is extended or adjusted under 35 U.S.C. 154(b) by 146 days.

(21) Appl. No.: 10/292,478

(22) Filed: Nov. 13, 2002

(65) Prior Publication Data

US 2003/0138228 A1 Jul. 24, 2003

(30) Foreign Application Priority Data

Nov. 15, 2001 (FR) .............................. 01 14790

(51) Int. Cl.[7] .............................................. G02B 6/22
(52) U.S. Cl. ..................................................... 385/127
(58) Field of Search ................................. 385/123–128

(56) References Cited

U.S. PATENT DOCUMENTS

| 5,361,319 | A | | 11/1994 | Antos et al. | |
|---|---|---|---|---|---|
| 6,263,138 | B1 | | 7/2001 | Sillard et al. | |
| 6,496,631 | B2 | * | 12/2002 | Tsukitani et al. | ........... 385/123 |
| 2003/0169986 | A1 | * | 9/2003 | Tsuzaki | ....................... 385/123 |
| 2004/0017988 | A1 | * | 1/2004 | Honma et al. | ............... 385/127 |

FOREIGN PATENT DOCUMENTS

DE 198 39 870 A1 3/2000

EP 1 081 514 A1 3/2001

OTHER PUBLICATIONS

Bertaina A et al.: "Line Fibers for New Transmission Windows" 14th Annual Meeting of the IEEE Lasers and Electro–Optics Society; San Diego, CA. United States Nov. 11–15, 2001, vol. 2, 2001, pp. 473–474, XP002203600 Conf. Proc Laser Electr Optic Soc Annu Meet CLEO; Conference Proceedings—Lasers and Electro–Optics Society Annual Meeting—LEOS 2001.

Bigo S et al>: "1.5 Terabit/s WDM Transmission of 150 Channels at 10GBIT/S over 4x100KM of Teralight Fibre" 25th European Conference on Optical Communication. (ECOC '99). Nice, France, Sep. 27–30, 1999. Regular and Invited Papers, European Conference on Optical Communication (ECOC), Paris: See, FR, vol. I of II, Sep. 26, 1999, pp. 40–41, XP002946214.

* cited by examiner

Primary Examiner—Edward J. Glick
Assistant Examiner—Thomas R Artman
(74) Attorney, Agent, or Firm—Sughrue Mion, PLLC

(57) ABSTRACT

The fiber is adapted to compensate chromatic dispersion and chromatic dispersion slope of a positive chromatic dispersion optical fiber in the U band from 1625 nm to 1675 nm. In that band it has negative chromatic dispersion, negative chromatic dispersion slope, and a chromatic dispersion over chromatic dispersion slope ratio from 100 nm to 600 nm. At a wavelength of 1650 nm it has bending losses less than 100 dB/m with the fiber wound around a 10 mm radius former and bending losses less than $5 \times 10^{-3}$ dB with 100 turns of the fiber wound around a 30 mm radius former. The dispersion compensating fiber can be used to produce broadband transmission systems for signals with wavelengths up to 1675 nm.

27 Claims, 1 Drawing Sheet

CHROMATIC DISPERSION COMPENSATING FIBER FOR USE IN U BAND OPTICAL FIBER TRANSMISSION SYSTEMS

The field of the present invention is that of optical fiber transmission, and more specifically that of compensating chromatic dispersion and chromatic dispersion slope in optical fiber transmission systems.

BACKGROUND OF THE INVENTION

The index profile of optical fibers is generally described by the shape of the graph of the function that associates the radius and the refractive index of the fiber. It is conventional to plot the distance r from the center of the fiber along the abscissa axis and the difference between the refractive index and that of the cladding of the fiber up the ordinate axis. Thus the terms "step", "trapezium" and "triangle" index profile are used for graphs which are respectively step-shaped, trapezium-shaped and triangular. These curves generally represent the theoretical or set point profile of the fiber, and fiber fabrication constraints can yield a significantly different profile.

It is advantageous to manage chromatic dispersion in new high bit rate wavelength division multiplexed transmission networks, especially for bit rates of 40 Gbit/s or 160 Gbit/s and above, the objective is to obtain substantially zero cumulative chromatic dispersion over the link for all the wavelength values of the multiplex, so as to limit widening of the pulses, the expression "cumulative chromatic dispersion" refers to the integral of the chromatic dispersion over the length of the fiber, for constant chromatic dispersion, the cumulative chromatic dispersion is equal to the product of the chromatic dispersion multiplied by the length of the fiber. A cumulative dispersion value of a few tens of picoseconds per nanometer (ps/nm) is generally acceptable. In the vicinity of the wavelengths used in the system it is also beneficial to avoid chromatic dispersion having zero values locally, since non-linear effects are greater at zero values. Finally, it is also beneficial to limit the cumulative chromatic dispersion slope over the range of the multiplex in order to prevent or limit distortion between the channels of the multiplex. The chromatic dispersion slope is the derivative of chromatic dispersion with respect to wavelength.

In optical fiber transmission systems it is conventional for line fibers to be stepped index fibers, also known as single mode fibers (SMF), or to be non-zero dispersion shifted fibers (NZ-DSF+). The term NZ-DSF+ is used for shifted dispersion fibers having positive non-zero chromatic dispersion at the wavelengths at which they are used, which are typically around 1550 nm. At these wavelengths the fibers have low chromatic dispersion, typically less than 11 picoseconds per nanometer kilometer (ps/(nm.km)) and a chromatic dispersion slope from 0.04 ps/(nm$^2$.km) to 0.1 ps/(nm$^2$.km) at 1550 nm.

Using short lengths of dispersion compensating fiber (DCF) to compensate chromatic dispersion and chromatic dispersion slope in SMF or NZ-DSF+ line fiber is known in the art. DCFs are described in various patents. In the vicinity of a wavelength of 1550 nm they have negative chromatic dispersion, which compensates the cumulative chromatic dispersion in the line fiber, and can also have negative chromatic dispersion slope, which compensates the positive chromatic dispersion slope of the line fiber. U.S. Pat. No. 5,568,583 and U.S. Pat. No. 5,361,319 propose a dispersion compensating fiber for compensating the chromatic dispersion of a single mode fiber with dispersion of the order of 17 ps/(nm.km) at 1550 nm. FR-A-99 08 298 and FR-A-01 06 246 describe dispersion compensating fibers adapted to compensate the chromatic dispersion and the chromatic dispersion slope of a dispersion shifted fiber. The cost of dispersion compensating fiber is generally higher than that of line fiber, and dispersion compensating fiber also has high attenuation.

One problem encountered in transmission systems is that of compensating chromatic dispersion over the whole of the bandwidth, in this context, a plurality of bands is generally defined arbitrarily within the range of wavelengths that can be used for optical fiber transmission, the C band extends from 1530 nm to 1565 nm and the L band is above the C band and extends up to wavelengths of the order of 1620 nm to 1625 nm. The XL or U band is above the L band and comprises wavelengths from 1625 nm to 1675 nm.

Prior art chromatic dispersion compensating fibers are generally difficult to use for compensating chromatic dispersion and chromatic dispersion slope in the U band. They are usually optimized for an operating point around 1550 nm, accordingly, at a wavelength of 1650 nm, they do not compensate chromatic dispersion or chromatic dispersion slope well, and they also have high bending losses in the U band.

OBJECTS AND SUMMARY OF THE INVENTION

The invention proposes a solution to the problem of compensating chromatic dispersion in optical fiber transmission networks, and in particular in transmission networks using the U band.

To be more precise, the invention proposes a fiber having a theoretical cut-off wavelength shorter than or equal to 1900 nm and, at a wavelength of 1650 nm:

chromatic dispersion less than or equal to −20 ps/(nm.km);
negative chromatic dispersion slope;
a ratio of chromatic dispersion over chromatic dispersion slope in the range 100 nm to 600 nm; and
an effective area greater than or equal to 15 square micrometers ($\mu m^2$), and, over a band from 1625 nm to 1675 nm:

bending losses with the fiber wound around a 10 millimeter (mm) radius former less than or equal to 100 decibels per meter (dB/m) or even less than or equal to 20 dB/m; and
bending losses with 100 turns of the fiber wound around a 30 mm radius former less than or equal to $5\times10^{-3}$ dB or even less than or equal to $10^{-4}$ dB.

The fiber can have, at a wavelength of 1650 nm:

polarization mode dispersion less than or equal to 0.2 ps/km$^{1/2}$ or even less than or equal to 0.1 ps/km$^{1/2}$ and preferably less than or equal to 0.05 ps/km$^{1/2}$; and
attenuation of less than 1 dB/km and preferably less than 0.8 dB/km.

The fiber advantageously has a rectangle or trapezium with buried trench and ring index profile and the parameters of the profile can be chosen from the following:

the difference ($\Delta n_1$) between the index of the rectangle or trapezium and the index of the cladding is from $16\times10^{-3}$ to $30\times10^{-3}$;

the radius ($r_1$) of the portion of the fiber having an index greater than that of the cladding is from 1.3 µm to 2.1 µm;

the difference ($\Delta n_2$) between the index of the depleted trench and the index of the cladding is from $-9 \times 10^{-3}$ to $-4.5 \times 10^{-3}$;

the outside radius ($r_2$) of said trench is from 3.4 µm to 6.2 µm;

the difference ($\Delta n_3$) between the index of the ring and the index of the cladding is from $1 \times 10^{-3}$ to $14 \times 10^{-3}$;

the outside radius ($r_3$) of said trench is from 5.9 µm to 8.6 µm;

twice the integral of the product of the radius and the index between a zero radius and the outside radius ($r_1$) of the central portion of the fiber having an index greater than that of the cladding is from $51 \times 10^{-3}$ µm² to $80 \times 10^{-3}$ µm²;

the integral of the index between a zero radius and the outside radius ($r_1$) of the central portion of the fiber having an index greater than that of the cladding is from $34 \times 10^{-3}$ µm to $38 \times 10^{-3}$ µm;

twice the integral of the product of the radius and the index between the outside radius ($r_1$) of the central portion of the fiber having an index greater than that of the cladding and the outside radius ($r_2$) of the buried portion is from $-200 \times 10^{-3}$ µm² to $-90 \times 10^{-3}$ µm²;

twice the integral of the product of the radius and the index between the outside radius ($r_2$) of the buried portion and the outside radius ($r_3$) of the ring is from $100 \times 10^{-3}$ µm² to $220 \times 10^3$ µm²; and twice the integral of the product of the radius and the index between a zero radius and the outside radius ($r_3$) of the ring is from $30 \times 10^{-3}$ µm² to $110 \times 10_{-3}$ µm².

The invention also proposes a transmission system including:

a sender of optical signals in the band from 1625 nm to 1675 nm;

a line optical fiber section ($6_i$); and a section ($12_i$) of an optical fiber of the kind referred to hereinabove for compensating dispersion in the line optical fiber.

In one embodiment, the line fiber includes single mode fiber. In this case it is preferable if the dispersion compensating fiber has:

at a wavelength of 1650 nm an effective area greater than or equal to 17 µm², preferably greater than or equal to 20 µm², or even greater than or equal to 22 µm²;

at a wavelength of 1650 nm a ratio of chromatic dispersion to chromatic dispersion slope from 380 nm to 500 nm and preferably from 400 nm to 480 nm.

In another embodiment the line fiber includes positive shifted dispersion fiber. In this case it is preferable if the dispersion compensating fiber has:

at a wavelength of 1650 nm an effective area greater than or equal to 18 µm² and preferably greater than or equal to 20 µm²; and at a wavelength of 1650 nm a ratio of chromatic dispersion to chromatic dispersion slope from 180 nm to 300 nm and preferably from 200 nm to 280 nm.

BRIEF DESCRIPTION OF THE DRAWINGS

Other features and advantages of the invention become apparent on reading the following description of embodiments of the invention, provided by way of example and with reference to the accompanying drawings, in which.

MORE DETAILED DESCRIPTION

The invention proposes a chromatic dispersion compensating fiber which has acceptable bending losses and is adapted to compensate chromatic dispersion and chromatic dispersion slope in an optical fiber transmission system using signals in the U band.

The fiber therefore has the following characteristics:

a theoretical cut-off wavelength less than or equal to 1900 nm and, at a wavelength of 1650 nm:

chromatic dispersion less than or equal to $-20$ ps/(nm.km);

negative chromatic dispersion slope;

a ratio of chromatic dispersion over chromatic dispersion slope from 100 nm to 600 nm; and an effective area greater than or equal to 15 µm², and, over a band from 1625 nm to 1675 nm:

bending losses with the fiber wound around a 10 mm radius former less than or equal to 100 dB/m; and bending losses with 100 turns of the fiber wound around a 30 mm radius former less than or equal to $5 \times 10^{-3}$ dB.

Its in-cable monomode behavior can be evaluated by measuring the cut-off wavelength in accordance with ITU-T standard G.650. This theoretical cut-off wavelength value ensures in-cable monomode behavior, and therefore good propagation of signals in the transmission system, note that the in-cable effective cut-off wavelength is typically a few hundred manometers lower than the theoretical cut-off wavelength.

The negative chromatic dispersion and chromatic dispersion slope compensate the chromatic dispersion and chromatic dispersion slope of an SMF or an NZ-DSF+, a highly negative chromatic dispersion limits the length of the compensating fiber needed to compensate cumulative chromatic dispersion in the line fiber.

Figure 1:
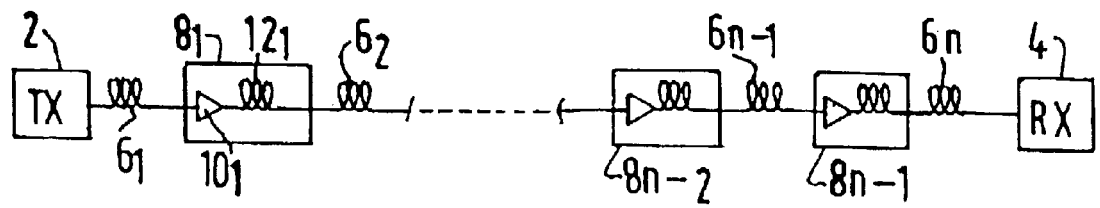
FIG. 1 is a diagrammatic representation of a transmission system constituting one embodiment of the invention.

The effective area limits losses and non-linear effects likely to occur at high powers of the signal propagating in the compensating fiber, especially in the transmission system of the invention shown in FIG. 1. An effective area greater than 15 µm² at 1650 nm limits non-linear effects throughout the U band.

Bending losses are evaluated in a manner known in the art by winding 100 turns of the fiber onto a 30 mm radius former and measuring the losses thus induced, the limit on the bending losses ensures that the fiber of the invention can withstand incorporation into a cable, as in FIG. 1. Another measuring method consists of bending the cable into a 10 mm radius half-loop and measuring the resulting losses. In this latter case, the result is expressed in the form of a loss per unit length in dB/m. In either case, the losses are representative of the aptitude of the fiber for effective use in a transmission system, whether in a repeater or as line fiber.

FIG. 1 is a diagram showing a transmission system constituting one embodiment of the invention. FIG. 1 shows the transmitter (TX) 2 and the receiver (RX) 4 of the transmission system, with the line fiber between them. The line fiber is formed of sections $6_1$ to $6_n$ separated by repeaters $8_1$ to $8_{n-1}$, each repeater $8_i$ includes an amplifier $10_i$ whose structure has no relevance to the invention and for this reason is not described. At the output of the amplifier is a dispersion compensating fiber section $12_i$. The light coming from the line fiber is therefore amplified and then passed through the dispersion compensating fiber section, in which chromatic dispersion and the chromatic dispersion slope are compensated. The dispersion compensating fiber is of the type described below with reference to FIGS. 2 and 3. The transmission system uses optical signals in the U band with wavelengths beyond 1625 nm. The line fiber can be an SMF or a dispersion shifted fiber, such as an NZ-DSF+ (see below).

Figure 2:
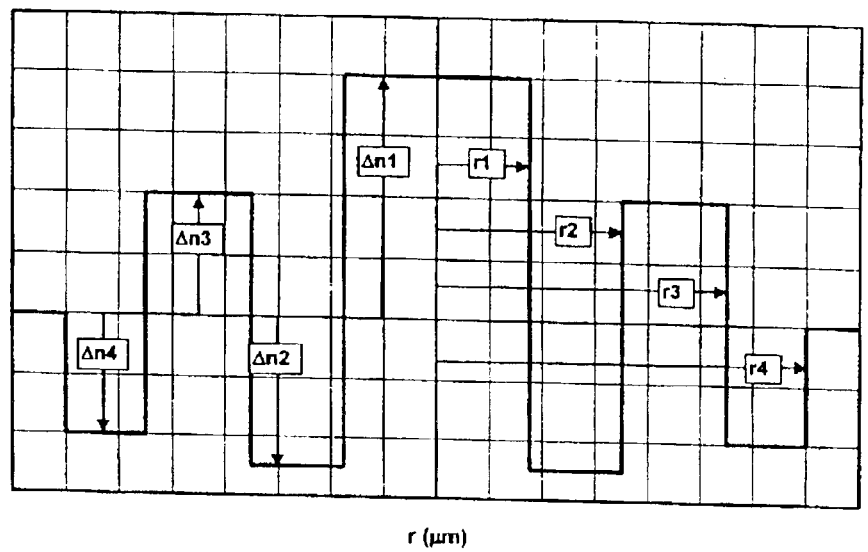
FIGS. 2 and 3 show profiles of dispersion compensating fibers that can be used in the FIG. 1 system.
Figure 3:
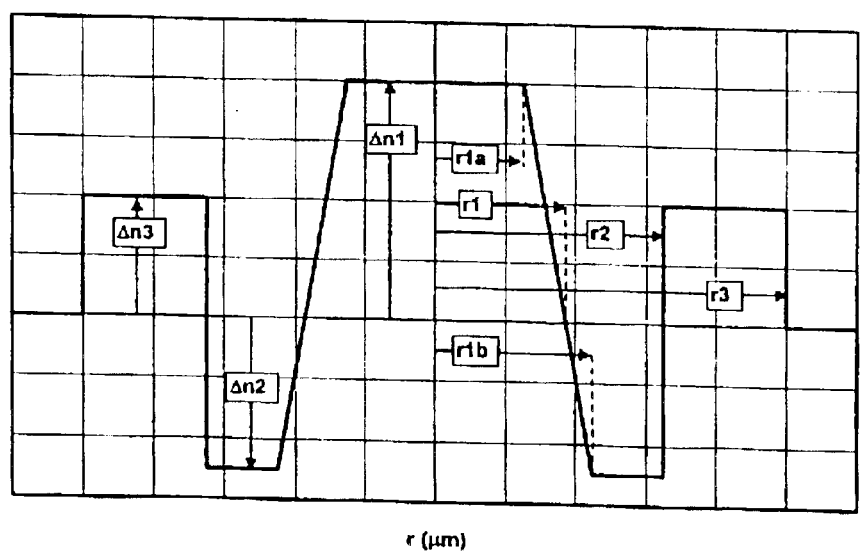

The FIG. 1 transmission system can be modified, thus filters can be incorporated, an amplifier added downstream of the (or the first) dispersion compensating fiber, etc. In FIG. 1, the devices $8_i$ are repeaters in that they include an amplifier, the amplifiers can be separate from the dispersion compensating fiber sections, in which case a unit containing a dispersion compensating fiber (with or without an amplifier) could be described as a compensation module. The dispersion compensating fiber can also be used as at least part of the line fiber. In this case, instead of being coiled up in a casing, the fiber extends along the transmission system. FIGS. 2 and 3 show possible set point index profiles for dispersion compensating fibers of the invention, the distance to the center of the fiber, expressed in micrometers, is plotted along the abscissa axis and the difference between the index and the index of the cladding is plotted up the ordinate axis. FIG. 2 shows a rectangle and ring profile and FIG. 3 shows a trapezium and ring profile. FIG. 2 therefore shows, starting from the center of the fiber:

a central portion of radius $r_1$ with a substantially constant index, and having a positive difference $\Delta n_1$ relative to the index of the cladding; and an annular portion extending between the radii $r_1$ and $r_2$, and having a negative difference $\Delta n_2$ relative to the index of the cladding, the combination constituting a rectangle with buried or depleted trench index profile. Around the buried trench, between the radii $r_2$ and $r_3$, the fiber has a ring, i.e. a portion with an index higher than the index of the cladding, which explains the term "rectangle with buried trench and ring" profile. The difference between the index of the ring and the index of the cladding is denoted $\Delta n_3$.

FIG. 3 shows a trapezium with buried trench and ring index profile. The only difference between this profile and the FIG. 2 profile is that the central portion is the shape of a trapezium and not a rectangle, with a minimum radius $r_{1a}$ and a maximum radius $r_{1b}$, $r_1$ is the value of the radius below which the index is higher than that of the cladding.

Embodiments of dispersion compensating fibers of the invention are described next. In a first embodiment the fiber is adapted to compensate the chromatic dispersion of a single mode fiber and in a second embodiment the fiber is adapted to compensate the chromatic dispersion of a positive dispersion shifted fiber.

At a wavelength of 1650 nm, the Applicant's ASMF 200 prior art single mode fiber typically has a chromatic dispersion C of the order of 23 ps/(nm.km) and a chromatic dispersion slope C' of the order of 0.052 ps/(nm².km). As usual, the expression chromatic dispersion slope refers to the partial derivative $\partial C/\partial \lambda$ of chromatic dispersion with respect to wavelength. The ratio C/C' of chromatic dispersion to chromatic dispersion slope is therefore close to 440 nm, to be more precise, it can be from 400 nm to 480 nm at a wavelength of 1650 nm.

The first embodiment of a fiber of the invention can therefore have the following additional characteristics:

chromatic dispersion C less than −50 ps/nm-km;
a ratio C/C' of chromatic dispersion over chromatic dispersion slope from 380 nm to 500 nm at a wavelength of 1650 nm; and
an effective area greater than or equal to 17 µm² at a wavelength of 1650 nm, or even greater than or equal to 20 µm² or 22 µm².

The negative chromatic dispersion and chromatic dispersion slope compensate the chromatic dispersion and chromatic dispersion slope of an SMF. The proposed range for the ratio C/C' is adapted to compensate the SMF in the U band at around 1650 nm.

The proposed effective area limits losses and non-linear effects, even more than the value of 15 µm² referred to above.

In addition to the above characteristics, the compensating fiber can have one or more of the following additional characteristics, measured at 1650 nm unless otherwise indicated:

sensitivity to microbending less than or equal to 1 and preferably less than or equal to 0.5;
polarization mode dispersion less than or equal to 0.2 ps/km$^{1/2}$, or even 0.1 ps/km$^{1/2}$, and preferably less than or equal to 0.05 ps/km$^{1/2}$;
a ratio of chromatic dispersion over attenuation less than or equal to −100 ps/(nm.dB), preferably less than or equal to −150 ps/(nm.dB), at a wavelength from 1625 nm to 1675 nm; and
attenuation less than 1 dB/km and preferably less than 0.8 dB/km.

The specified chromatic dispersion limits the length of the dispersion compensating fiber and thus the attenuation in that fiber. The sensitivity of the fiber to microbending is evaluated relative to the Applicant's ASMF 200 fiber, the method known in the art of crushing the fiber between two grids can be used. The specified sensitivity to microbending also improves the aptitude of the fiber for incorporation into a cable. This is because limiting microbending losses limits the attenuation increments of the fiber when incorporated in a cable. This improves the strength of the fiber in the cable.

The specified limits on the bending losses or the sensitivity to microbending mean that the dispersion compensating fiber can be coiled up in the repeaters. The specified polarization mode dispersion ensures good transmission at high bit rates. The specified attenuation is representative of the losses in the compensating fiber. The ratio of chromatic dispersion over attenuation is representative of the ability of the fiber to compensate chromatic dispersion: a high absolute value of chromatic dispersion is advantageous for fast chromatic dispersion compensation and a low attenuation value limits losses in the dispersion compensating fiber.

Examples of fibers conforming to the first embodiment of the invention are described next. Table I sets out profile parameter values for these examples, using the notation explained with reference to FIGS. 2 and 3.

TABLE I

| Fiber | $r_{1a}$ (μm) | $r_1$ (μm) | $r_{1b}$ (μm) | $r_2$ (μm) | $r_3$ (μm) | $10^3 \Delta n_1$ | $10^3 \Delta n_2$ | $10^3 \Delta n_3$ |
|---|---|---|---|---|---|---|---|---|
| S1 | 1.74 | 1.74 | 1.74 | 5.22 | 6.70 | 20.6 | −6.1 | 11.0 |
| S2 | 1.67 | 1.67 | 1.67 | 4.50 | 7.04 | 21.1 | −6.4 | 4.0 |
| S3 | 2.10 | 2.10 | 2.10 | 5.14 | 6.95 | 16.2 | −8.0 | 9.4 |
| S4 | 1.83 | 1.83 | 1.83 | 4.64 | 6.94 | 19.2 | −7.8 | 6.7 |
| S5 | 1.47 | 1.47 | 1.47 | 5.55 | 6.99 | 23.9 | −4.6 | 6.2 |
| S6 | 1.36 | 1.36 | 1.36 | 4.54 | 7.82 | 27.6 | −5.3 | 3.9 |
| S7 | 1.25 | 1.68 | 1.78 | 5.09 | 6.43 | 24.3 | −5.5 | 7.7 |
| S8 | 1.37 | 1.82 | 1.96 | 4.51 | 6.87 | 22.2 | −6.9 | 5.3 |
| S9 | 1.29 | 1.59 | 1.66 | 4.62 | 6.3 | 25.5 | −6.4 | 7.7 |

Fibers S1 to S6 have a FIG. 2 rectangle with buried trench and ring profile. Fibers S7 to S9 have a FIG. 3 trapezium with buried trench and ring profile. Table II sets out the optical characteristics of the fibers from Table I.

TABLE II

| Fiber | $\lambda_{cth}$ nm | $2W_{02}$ μm @ 1650 nm | $S_{eff}$ μm² @ 1650 nm | C ps/ nm · km @ 1650 nm | C/C' nm @ 1650 nm | 10 mm BL dB/m @ 1650 nm | 10 mm BL dB/m @ 1675 nm |
|---|---|---|---|---|---|---|---|
| S1 | 1880 | 5.2 | 22 | −89 | 430 | 0.05 | <20 |
| S2 | 1700 | 5.1 | 20.3 | −85 | 440 | 0.34 | <20 |
| S3 | 1895 | 5.7 | 27.9 | −74 | 450 | 0.91 | <20 |
| S4 | 1779 | 5.4 | 24.0 | −95 | 470 | 0.78 | <20 |
| S5 | 1686 | 4.8 | 18.0 | −85 | 430 | 0.72 | <20 |
| S6 | 1786 | 4.7 | 17.1 | −130 | 420 | 0.05 | <20 |
| S7 | 1695 | 4.8 | 17.7 | −85 | 440 | 0.04 | <20 |
| S8 | 1759 | 5 | 19.6 | −87 | 440 | 0.03 | <20 |
| S9 | 1735 | 4.8 | 18.1 | −110 | 470 | 0.04 | <20 |

Table II shows that the fibers from Table I have the propagation characteristics referred to above. In all cases, the bending losses with 100 turns of fiber wound around a 30 mm radius former are less than $10^{-4}$ dB at a wavelength of 1675 nm.

A transmission system using ASMF 200 line fiber and the fiber S6 from Table I as dispersion compensating fiber is described next. To be more specific, the SMF has a chromatic dispersion of the order of 23 ps/(nm.km) at 1650 nm. The chromatic dispersion slope at 1650 nm is of the order of 0.052 ps/(nm².km). The ratio C/C' of chromatic dispersion to chromatic dispersion slope is close to 440 nm. Each section $6_i$ of the line fiber has a length $L_G$ of 100 km. Each section $12_i$ of the dispersion compensating fiber is 17.5 km long. The cumulative chromatic dispersion and the cumulative chromatic dispersion slope in a line fiber section and in a dispersion compensating fiber section have the values set out in Table III, for various wavelengths in the U band. Given the values specified for the proposed system, the cumulative chromatic dispersion in the U band remains below 50 ps/nm, or even below 25 ps/nm. The table also sets out the bending losses of the dispersion compensating fiber with the fiber wound around a 10 mm radius former (losses per unit length expressed in dB/m).

TABLE III

|  | 1625 nm | 1650 nm | 1675 nm |
|---|---|---|---|
| Cumulative C (ps/nm) | 12.1 | 0.0 | −12.6 |
| Cumulative C' (ps/nm²) | −0.098 | −0.236 | 0.001 |

TABLE III-continued

|  | 1625 nm | 1650 nm | 1675 nm |
|---|---|---|---|
| 10 mm BL (dB/m) | <20 | <20 | <20 |
| 30 mm BL (dB) | <10⁻⁴ | <10⁻⁴ | <10⁻⁴ |

Table IV shows for comparison the same parameters for a system using a prior art dispersion compensating fiber of the kind described in U.S. Pat. No. 5,361,319. The fiber has a profile of the kind shown in FIG. 8 of that patent, namely a rectangle with buried trench and ring profile. The characteristics of the profile are extracted from Table 1:

core radius: 1.5 μm;
index difference between core and cladding: 1.8%;
outside radius of buried trench: 3.7 μm;
index difference between trench and cladding: −0.2%;
outside radius of ring: 7.9 μm; and
index difference between ring and cladding: 0.16%.

Each line fiber section has a length $L_G$ of 100 km. Each section of the prior art dispersion compensating fiber has a length of 33.2 km, chosen to minimize cumulative chromatic dispersion at 1650 nm. The units are the same as in Table III.

TABLE IV

|  | 1625 nm | 1650 nm | 1675 nm |
|---|---|---|---|
| Cumulative C (ps/nm) | −120.6 | 0.0 | 102.9 |
| Cumulative C' (ps/nm²) | 3.573 | 3.587 | 3.699 |
| 10 mm BL (dB/m) | <20 | <20 | <20 |
| 30 mm BL (dB) | <10⁻⁴ | <10⁻⁴ | <10⁻⁴ |

Comparing Tables III and IV shows that the prior art fiber has acceptable characteristics in terms of bending losses in the U band but cannot compensate chromatic dispersion or chromatic dispersion slope in the U band.

Table V sets out the same parameters as Table IV for another fiber described in U.S. Pat. No. 5,361,319. This fiber again has a profile of the kind shown in FIG. 8 of that patent, namely a rectangle with buried trench and ring profile. The characteristics of the profile are again extracted from Table 1:

core radius: 1.43 μm;
index difference between core and cladding: 1.6%;
outside radius of buried trench: 4.87 μm;
index difference between trench and cladding: −0.4%;
outside radius of ring: 6.5 μm; and
index difference between ring and cladding: 0.32%.

Each line fiber section has a length $L_G$ of 100 km. Each section of the prior art dispersion compensating fiber has a length of 19.9 km, chosen to minimize the cumulative chromatic dispersion at 1650 nm.

TABLE V

|  | 1625 nm | 1650 nm | 1675 nm |
|---|---|---|---|
| Cumulative C (ps/nm) | 15.6 | 0.0 | −24.2 |
| Cumulative C' (ps/nm²) | −0.184 | −0.572 | −0.746 |
| 10 mm BL (dB/m) | <20 | >20 | >20 |
| 30 mm BL (dB) | <10⁻⁴ | <10⁻⁴ | >10⁻⁴ |

Table V shows that the absolute value of the cumulative chromatic dispersion in the U band remains below 50 ps/nm, which is an acceptable limit. However, the bending losses from Table V are much higher than those from Table III. Thus the prior art fiber is difficult to use in the U band, because of its high bending losses. In contrast, the fiber of the invention is more suitable than the prior art fiber for compensating chromatic dispersion of the SMF in the U band, whilst having acceptable bending losses.

Embodiments of dispersion compensating fibers conforming to a second embodiment of the invention are described next. The fiber is adapted to compensate the chromatic dispersion of a positive shifted dispersion fiber. At a wavelength of 1650 nm, a prior art dispersion shifted fiber such as the Applicant's TeraLight fiber typically has a chromatic dispersion C of the order of 14 ps/(nm.km) and a chromatic dispersion slope C' of the order of 0.058 ps/(nm².km). The ratio C/C' is around 240 nm.

The second embodiment of the fiber of the invention can have the following additional characteristics:

chromatic dispersion C less than −50 ps/nm.km at a wavelength of 1650 nm;
a ratio C/C' of chromatic dispersion over chromatic dispersion slope at a wavelength of 1650 nm from 180 to 300, and better from 200 to 280; and
an effective area at a wavelength of 1650 nm greater than or equal to 18 $\mu m^2$, or even greater than or equal 20 $\mu m^2$.

These characteristics have the advantages described above with reference to the first embodiment.

The fiber of the second embodiment can also have the additional optical characteristics described with reference to the first embodiment.

Table VI sets out profile parameters for the fibers using the notation explained with reference to FIGS. 2 and 3.

TABLE VI

| Fiber | $r_{1a}$ (μm) | $r_1$ (μm) | $r_{1b}$ (μm) | $r_2$ (μm) | $r_3$ (μm) | $10^3 \Delta n_1$ | $10^3 \Delta n_2$ | $10^3 \Delta n_3$ |
|---|---|---|---|---|---|---|---|---|
| T1 | 1.53 | 1.53 | 1.53 | 5.18 | 8.26 | 23.7 | −5.9 | 4.2 |
| T2 | 1.85 | 1.85 | 1.85 | 4.93 | 7.88 | 19.4 | −8.1 | 5.2 |
| T3 | 1.63 | 1.63 | 1.63 | 5.20 | 7.66 | 22.0 | −6.4 | 5.6 |
| T4 | 1.66 | 1.66 | 1.66 | 4.31 | 8.11 | 22.7 | −8.8 | 3.9 |
| T5 | 1.39 | 1.39 | 1.39 | 5.21 | 7.72 | 26.5 | −5.4 | 5.9 |
| T6 | 1.34 | 1.79 | 1.92 | 5.81 | 7.37 | 22.5 | −6.3 | 10 |
| T7 | 1.25 | 1.56 | 1.66 | 5.02 | 7.10 | 26.8 | −8.3 | 6.9 |

The fibers T1 to T5 have a FIG. 2 rectangle with buried trench and ring profile. The fibers T6 and T7 have a FIG. 3 trapezium with buried trench and ring profile. Table VII sets out the optical characteristics of the fibers from Table VI.

TABLE VII

| Fiber | $\lambda_{cth}$ nm | $2W_{02}$ μm @ 1650 nm | $S_{eff}$ μm² @ 1650 nm | C ps/ nm · km @ 1650 nm | C/C' nm @ 1650 nm | BL Ø 20 mm dB/m @ 1650 nm | BL Ø 20 mm dB/m @ 1675 nm |
|---|---|---|---|---|---|---|---|
| T1 | 1829 | 4.8 | 17.6 | −95 | 255 | 0.53 | <20 |
| T2 | 1872 | 5.1 | 20.5 | −82 | 230 | 0.13 | <20 |
| T3 | 1818 | 4.9 | 18.8 | −93 | 250 | 0.56 | <20 |
| T4 | 1828 | 4.8 | 18.3 | −107 | 255 | 0.22 | <20 |
| T5 | 1886 | 4.7 | 17.4 | −125 | 270 | 0.11 | <20 |
| T6 | 1871 | 4.8 | 18.2 | −85 | 235 | 0.12 | <20 |
| T7 | 1795 | 4.4 | 15.1 | −116 | 215 | 0.18 | <20 |

Table VII shows that the fibers from Table VI have the propagation characteristics mentioned above. As in the case of the fibers from Table II, the bending losses measured at a wavelength of 1675 nm with 100 turns of fiber wound around a 30 mm radius former are less than $10^{-4}$ dB.

A transmission system using TeraLight NZ-DSF+ line fiber and the fiber T4 from Table VI as dispersion compensating fiber is described next. At 1650 nm TeraLight fiber has the chromatic dispersion and chromatic dispersion slope values specified above, with a ratio C/C' of 240 nm. Each line fiber section $6_i$ has a length $L_G$ of 100 km. Each section $12_i$ of the dispersion compensating fiber has a length of 13.2 km. The cumulative chromatic dispersion and the cumulative chromatic dispersion slope in a line fiber section and in a dispersion compensating fiber section have the values set out in Table VIII for various wavelengths in the U band. As previously, the table also indicates the bending losses.

TABLE VIII

|  | 1625 nm | 1650 nm | 1675 nm |
|---|---|---|---|
| Cumulative C (ps/nm) | −19.8 | 0.0 | 10.6 |
| Cumulative C' (ps/nm²) | 0.596 | 0.321 | 0.263 |
| 10 mm BL (dB/m) | <20 | <20 | <20 |
| 30 mm BL (dB) | <10⁻⁴ | <10⁻⁴ | <10⁻⁴ |

With the above values, and as in the preceding embodiment, the absolute value of the cumulative chromatic dispersion of the system in the U band remains less than 50 ps/nm, or even less than 25 ps/nm.

Like Table IV, Table IX shows for comparison the cumulative chromatic dispersion and the cumulative chromatic dispersion slope of a system using a prior art dispersion compensating fiber, the prior art fiber is the same as that from Table IV, i.e. the fiber from example 1 of U.S. Pat. No.

5,361,819 with the profile characteristics referred to above. In this example, the length of the prior art fiber is 20.4 km and the length of the NZ-DSF+ is 100 km. This length is chosen to limit the cumulative chromatic dispersion at 1650 nm. Table IX shows that the prior art fiber has acceptable bending losses, but cannot compensate chromatic dispersion and chromatic dispersion slope in the U band.

TABLE IX

|  | 1625 nm | 1650 nm | 1675 nm |
|---|---|---|---|
| Cumulative C (ps/nm) | −129.6 | 0.0 | 132.1 |
| Cumulative C' (ps/nm$^2$) | 4.123 | 4.277 | 4.519 |
| 10 mm BL (dB/m) | <20 | <20 | <20 |
| 30 mm BL (dB) | <10$^{-4}$ | <10$^{-4}$ | <10$^{-4}$ |

Table X is analogous to Table V, for the same type of prior art fiber, the system comprises 100 km of TeraLight NZ-DSF+ and 12.3 km of prior art fiber.

TABLE X

|  | 1625 nm | 1650 nm | 1675 nm |
|---|---|---|---|
| Cumulative C (ps/nm) | −57.0 | 0.0 | 54.0 |
| Cumulative C' (ps/nm$^2$) | 0.366 | 0.118 | 0.074 |
| 10 mm BL (dB/m) | <20 | >20 | >20 |
| 30 mm BL (dB) | <10$^{-4}$ | <10$^{-4}$ | >10$^{-4}$ |

As in Table V, it is apparent that the absolute value of the cumulative chromatic dispersion is close to the acceptable limit of 50 ps/nm. The bending losses are high, however.

Tables IX and X show that the fiber of the invention provides good compensation of chromatic dispersion and chromatic dispersion slope in the U band, whilst having acceptable bending losses in that band. On the other hand, the prior art fibers offered by way of comparison have either the capacity to compensate chromatic dispersion and chromatic dispersion slope or acceptable bending losses, but not both at once.

The profile of the fiber of the invention can be generally characterized in the following manner. As indicated above, the profile is a trapezium or rectangle with buried or depleted trench and ring profile. The central portion has an index difference relative to the cladding that satisfies the condition:

$$16 \times 10^{-3} \leq \Delta n_1 \leq 30 \times 10^{-3}$$

It is advantageous if the radius $r_1$ expressed in micrometers satisfies the condition:

$$1.3 \, \mu m \leq r_1 \leq 2.1 \, \mu m$$

Values for the index difference $\Delta n_2$ and the outside radius $r_2$ of the buried trench can be chosen to satisfy the conditions:

$$-9 \times 10^{-3} \leq n_2 \leq -4.5 \times 10^{-3} \text{ and}$$

$$3.4 \, \mu m \leq r_2 \leq 6.2 \, \mu m$$

For the ring, the values of the index difference $\Delta_3$ and the outside radius $r_3$ can be chosen to satisfy the conditions:

$$1 \times 10^3 \leq \Delta_3 \leq 14 \times 10^{-3} \text{ and}$$

$$5.6 \, \mu m \leq r_3 \leq 8.6 \, \mu m$$

Other characterizations of the fiber are possible. Thus it is possible to use the parameter $S_1$ defined as follows:

$$S_1 = 2 \cdot \int_0^{r_1} \Delta n(r) \cdot r \, dr$$

This parameter is homogeneous to the product of a radius squared and an index. It applies simply to the trapezium profile and to the rectangle profile, and is representative of the increased index in the vicinity of the core of the fiber. In the case of a rectangle index profile, the value of this parameter is $\Delta n_1 \cdot r_1^2$ and preferably from $51 \times 10^{-3} \, \mu m^2$ to $80 \times 10^{-3} \, \mu m^2$.

Another possible parameter is the parameter $S_{01}$ defined as follows:

$$S_{01} = \int_0^{r_1} \Delta n(r) \, dr$$

This parameter is the integral of the index of the rectangle or ring core of the fiber. In physical terms, this parameter is representative of the area of the core in a radius/index plane. Its value is preferably from $34 \times 10^{-3} \, \mu m$ to $38 \times 10^{-3} \, \mu m$.

It is also possible to use the parameter $S_2$ defined as follows:

$$S_2 = 2 \cdot \int_{r_1}^{r_2} \Delta n(r) \cdot r \, dr$$

This parameter is similar to the parameter $S_1$, but applies to the buried trench. It is also homogeneous to the product of a radius squared and an index. This parameter is representative of the reduced index in the buried trench. Its value is preferably from $-200 \times 10^{-3} \, \mu m^2$ to $-90 \times 10^{-3} \, \mu m^2$.

Likewise, the parameter $S_3$ defined as follows:

$$S_3 = 2 \cdot \int_0^{r_3} \Delta n(r) \cdot r \, dr$$

is homogeneous to the product of a radius squared and an index and is representative of the increased index in the ring. Its value is preferably from $100 \times 10^{-3} \, \mu m^2$ to $220 \times 10^{-3} \, \mu m^2$.

Finally, the parameter $S_{123}$ which is defined as follows:

$$S_{123} = 2 \cdot \int_0^{r_3} \Delta n(r) \cdot r \, dr$$

is the sum of the parameters $S_1$, $S_2$ and $S_3$ and is representative of the increased index in the fiber as a whole. Its value is preferably from $30 \times 10^{-3} \, \mu m^2$ to $110 \times 10^{-3} \, \mu m^2$.

The profile of the fiber of the invention is defined by any of these parameters or a combination of them.

The fiber of the invention can be fabricated using techniques known to the person skilled in the art, such as the MCVD or OVD process, or other techniques routinely used to fabricate optical fibers.

Of course, the invention is not limited to the embodiments described above, the dispersion compensating fibers can have profiles different from those of FIGS. 2 and 3, the line fibers can also be different from the SMF and the NZ-DSF+ described by way of example. The structure of the transmission system can differ from that shown in FIG. 1.

What is claimed is:

1. An optical fiber having a theoretical cut-off wavelength less than or equal to 1900 nm and, at a wavelength of 1650 nm:

chromatic dispersion less than or equal to −20 ps/(nm.km);

a negative chromatic dispersion slope;

a ratio of chromatic dispersion over chromatic dispersion slope from 100 nm to 600 nm; and an effective area greater than or equal to 15 $\mu m^2$, and, over a band from 1625 nm to 1675 nm:

bending losses with the fiber wound around a 10 mm radius former less than or equal to 100 dB/m; and bending losses with 100 turns of the fiber wound around a 30 mm radius former less than or equal to 5×10$^{-3}$ dB.

2. The fiber of claim 1, wherein over a band from 1625 nm to 1675 nm the bending losses with the fiber wound around a 10 mm radius former are less than or equal to 20 dB/m.

3. The fiber of claim 1, wherein over a band from 1625 nm to 1675 nm the bending losses with 100 turns of the fiber wound around a 30 mm radius former are less than or equal to 10$^{-4}$ dB.

4. The fiber of claim 1, wherein at a wavelength from 1625 nm to 1675 nm it has a ratio of chromatic dispersion to attenuation less than or equal to −100 ps/(nm.dB) and preferably less than or equal to −150 ps/(nm.dB).

5. The fiber of claim 1, wherein at a wavelength of 1650 nm it has a chromatic dispersion less than or equal to −50 ps/(nm.km).

6. The fiber of claim 1, wherein at a wavelength of 1650 nm it has a sensitivity to microbending less than or equal to 1 and preferably less than or equal to 0.5.

7. The fiber of claim 1, wherein at a wavelength of 1650 nm it has a polarization mode dispersion less than or equal to 0.2 ps/km$^{1/2}$, or even less than or equal to 0.1 ps/km$^{1/2}$, and preferably less than or equal to 0.05 ps/km$^{1/2}$.

8. The fiber of claim 1, wherein at a wavelength of 1650 nm it has an attenuation less than 1 dB/km and preferably less than 0.8 dB/km.

9. The fiber of claim 1, having a rectangle or trapezium with buried trench and ring index profile.

10. The fiber of claim 9, wherein the difference between the index of the rectangle or trapezium and the index of the cladding is from 16×10$^{-3}$ to 30×10$^{-3}$ and the radius of the portion of the fiber having an index greater than that of the cladding is from 1.3 $\mu m$ to 2.1 $\mu m$.

11. The fiber of claim 10, wherein the difference between the index of the depleted trench and the index of the cladding is from −9×10$^{-3}$ to −4.5×10$^{-3}$ and the outside radius of said trench is from 3.4 $\mu m$ to 6.2 $\mu m$.

12. The fiber of claim 11, wherein the difference between the index of the ring and the index of the cladding is from 1×10$^{-3}$ to 14×10$^{-3}$ and the outside radius of said trench is from 5.9 $\mu m$ to 8.6 $\mu m$.

13. The fiber of claim 9 or 12, wherein twice the integral of the product of the radius and the index between a zero radius and the outside radius of the central portion of the fiber having an index greater than that of the cladding is from 51×10$^{-3}$ $\mu m^2$ to 80×10$^{-3}$ $\mu m^2$.

14. The fiber of claim 13, wherein the integral of the index between a zero radius and the outside radius of the central portion of the fiber having an index greater than that of the cladding is from 34×10$^{-3}$ $\mu m$ to 38×10$^{-3}$ $\mu m$.

15. The fiber of claim 14, wherein twice the integral of the product of the radius and the index between the outside radius of the central portion of the fiber having an index greater than that of the cladding and the outside radius of the buried portion is from −200×10$^{-3}$ $\mu m^2$ to −90×10$^{-3}$ $\mu m^2$.

16. The fiber of claim 15, wherein twice the integral of the product of the radius and the index between the outside radius of the buried portion and the outside radius of the ring is from 100×10$^{-3}$ $\mu m^2$ to 220×10$^{-3}$ $\mu m^2$.

17. The fiber of claim 16, wherein twice the integral of the product of the radius and the index between a zero radius and the outside radius of the ring is from 30×10$^{-3}$ $\mu m^2$ to 110×10$^{-3}$ $\mu m^2$.

18. A transmission system including:

a sender of optical signals in the band from 1625 nm to 1675 nm;

a line optical fiber section; and a section of an optical fiber according to claim 1 for compensating dispersion in the line optical fiber.

19. The system of claim 18, wherein the line fiber includes single mode fiber.

20. The system of claim 19, wherein at a wavelength of 1650 nm the dispersion compensating fiber has an effective area greater than or equal to 17 $\mu m^2$, preferably greater than or equal to 20 $\mu m^2$, or even greater than or equal to 22 $\mu m^2$.

21. The system according to claim 18, wherein at a wavelength of 1650 nm the dispersion compensating fiber has a ratio of chromatic dispersion to chromatic dispersion slope from 380 nm to 500 nm.

22. The system of claim 21, wherein at a wavelength of 1650 nm the dispersion compensating fiber has a ratio of chromatic dispersion to chromatic dispersion slope from 400 nm to 480 nm.

23. The system of claim 18, wherein the line fiber includes positive shifted dispersion fiber.

24. The system of claim 23, wherein at a wavelength of 1650 nm the dispersion compensating fiber has an effective area greater than or equal to 18 $\mu m^2$ and preferably greater than or equal to 20 $\mu m^2$.

25. The system of claim 23, wherein at a wavelength of 1650 nm the dispersion compensating fiber has a ratio of chromatic dispersion to chromatic dispersion slope from 180 nm to 300 nm.

26. The system of claim 25, wherein at a wavelength of 1650 nm the dispersion compensating fiber has a ratio of chromatic dispersion to chromatic dispersion slope from 200 nm to 280 nm.

27. The system of claim 18, wherein the absolute value of the cumulative chromatic dispersion in the U band remains less than 50 ps/nm and preferably less than 25 ps/nm.

* * * * *